United States Patent [19]

Dettling, Jr.

[11] Patent Number: 5,238,324
[45] Date of Patent: Aug. 24, 1993

[54] COMBINATION WHEELED BOAT DOCK AND LIFT

[76] Inventor: Mathias Dettling, Jr., P.O. Box 1295, Watford City, N. Dak. 58854

[21] Appl. No.: 1,758

[22] Filed: Jan. 7, 1993

[51] Int. Cl.⁵ .............................................. B63C 1/00
[52] U.S. Cl. ........................................ 405/3; 405/220
[58] Field of Search ................... 405/1, 3, 4, 7, 218, 405/220, 221; 114/44, 48; 414/678

[56] References Cited

U.S. PATENT DOCUMENTS

| | | |
|---|---|---|
| 3,169,644 | 2/1965 | Godbersen ...................... 405/221 X |
| 3,951,087 | 4/1976 | Carson ................................. 405/3 X |
| 4,505,619 | 3/1985 | Sargent ................................. 405/220 |
| 4,645,380 | 2/1987 | Hambrick et al. .................. 405/220 |
| 4,787,327 | 11/1988 | Porter ................................... 114/44 |
| 5,165,823 | 11/1992 | Cupples .......................... 405/220 X |

Primary Examiner—David H. Corbin
Attorney, Agent, or Firm—David A. Lingbeck

[57] ABSTRACT

This invention relates to a combination wheeled boat duck and lift which is portable for easy, convenient, and safe movement to and use in almost any location about a body of water. The boat dock and lift comprises a pair of wing decks hingedly attached to a forward main deck. The wing decks can be folded upon the hinged joints for easy transportation of the boat dock and lift and are vertically adjustable with jackscrew means to provide a level surface relative to the main deck for a user to safely walk thereupon. The wing decks and main deck cooperatively define a boat receiving space therebetween with a lift frame base adjustably mounted in the boat receiving space. A winch mechanism is used to raise and lower the lift frame base relative to the wing decks and the main deck. This boat dock and lift provides the user with convenient and safe access to his/her boat from any side thereof.

8 Claims, 8 Drawing Sheets

COMBINATION WHEELED BOAT DOCK AND LIFT

BACKGROUND OF THE INVENTION

The present invention relates, in general, to a combination portable boat dock and lift.

The prior art includes boat docks which are permanently installed with posts driven into the lake or river bottom and the ramp fixedly attached to the posts for mooring the boats and for boarding and alighting from the boat and includes boat lifts which are removably positioned adjacent the permanently-installed boat docks and which have a wheel-less main frame and a lifting frame which is raised and lowered with a winch mechanism. Permanently-installed boat docks are indeed old in the art but do not provide the user with the convenience and flexibility of mooring his/her boat wherever the user wants. Wheel-less boat lifts are also old in the art, and normally cooperate with the permanently-installed boat docks and cannot be conveniently moved about as desired by the user.

Another known prior art is the flotation boat dock which comprises an elongated frame structure having a plurality of planks closely mounted one to another on the frame structure for the user to walk thereupon and which further comprises a plurality of flotation barrels attached beneath the frame structure to provide buoyancy to the frame structure so that the boat dock floats upon the water and can be conveniently slid out of the water but aren't easily movable since the flotation boat dock typically is without wheels for easy transportation thereof. Boats can be moored to the flotation boat dock which do not have boat lifts attached thereto because the flotation boat dock doesn't have the stability to support a boat raised above the surface of the water.

Another known prior art is a BOAT TRAILER FOR TRANSPORTING A BOAT, U.S. Pat. No. 4,029,227, which comprises a longitudinal frame element having a pair of side members interconnected at their forward ends by a cross member and a transverse member; a gripping means mounted along the length of the longitudinal frame member for gripping the bottom of the boat to immobilize the boat for the transportation thereof; a wheel system mounted on opposite ends of the transverse frame; and adjustable means for raising and lowering the boat as desired by the user for unloading and transporting the boat. The BOAT TRAILER FOR TRANSPORTING A BOAT is specifically constructed to transport a boat not to dock a boat and/or lift a boat out of the water as is the present invention.

There are no combination boat docks and boat lifts of the type presented in the present invention. There is a definite need for combination portable boat dock and lift which overcomes all the problems associated with mooring boats and lifting a boat out of the water.

SUMMARY OF THE INVENTION

The present invention relates to a combination portable boat dock and lift which comprises a main deck; a pair of wing decks extending rearward from the main deck and defining a boat receiving space therebetween; a tongue member fixedly attached to and extending forward the main forward deck for detachably mounting to a hitch on a vehicle; a pair of adjustable handled stake members adjustably and opposedly mounted on the main deck for stabilizing and securing the apparatus on the shore; a generally rectangular lift frame base adjustably mounted in the boat receiving space for lifting and lowering the boat; a transverse arch support member fixedly mounted above the boat receiving space for supporting and stabilizing the apparatus; and a pair of wheeled axles for conveniently transporting the apparatus. The wing decks are hingedly attached to the main deck for effective raising the wing decks in a generally vertical locking position for easy transportation of the apparatus.

It is an object of this invention to provide a combination wheeled boat dock and lift which can be effectively and simply wheeled to any desirable location on any reasonably accessible shorelines on rivers, lakes, and the like by rearwardly moving the apparatus in the water with a vehicle or even by hand of the user.

Another object of the present invention is to provide a combination wheeled boat dock and lift which provides a well-balanced and stable apparatus for the user to confidently and with ease board and debark a boat moored to this apparatus.

Further, another object of the present invention is to provide a combination wheeled boat dock and lift which permits the user the convenience of boarding and debarking a boat in the boat receiving space from either side thereof.

Also, another object of the present invention is to provide a combination wheeled boat dock and lift which permits the user to conveniently moor boats to the wing decks on either side of the boat receiving space without interference from a boat raised in the boat receiving space.

Yet, another object of the present invention is to provide a combination wheeled boat dock and lift which provides wing decks conveniently foldable for moving the apparatus to other desired locations.

Further objects and advantages of the present invention will become apparent as the description proceeds and when taken in conjunction with the accompanying drawing wherein:

DETAILED DESCRIPTION OF THE INVENTION

Referring in particular to FIGS. 1, 2, 3, 4, 5, 6, 7, and 8, the combination wheeled boat dock and lift 10 is illustrated as comprising a pair of tubular stub axles 11 and 12 interconnected and spaced apart by an angled elongated transverse frame member 13 preferably constructed of metal; a pair of wheels 14 and 15 detachably rotatably mounted to the axles 11 and 12 for moving the combination dock and lift 10; a pair of skid plates 16 and 17 fixedly attached to or welded at spaced intervals on a bottom of the transverse frame 13 to substantially prevent the dock and lift 10 from sinking into the mud on the floor of the water; a main deck 18 having a main frame comprising parallel beams preferably constructed of metal welded to or fastened to perimeter rails molded, welded, or fastened end to end to support the main deck 18, having a pair of generally parallel elongate extensions 19 and 20 extending to the rear of the boat dock and lift and defining a boat receiving space therebetween and having a generally Y-shaped floor 22 fixedly mounted or bolted upon the main frame for the user to easily board the dock 10 from the shore; and a pair of elongate wing decks 23 and 24 hingedly attached to and generally extending rearward from the main deck 18 and adjacent the parallel elongate extensions of the main deck 18, having each an elongated wing frame comprising a plurality of cross brace members 25 affixed to perimeter rails welded or bolted end to end to strengthen and support the wing decks 23 and 24 and having each four arms 81 spaced apart and pivotally attached to the cross brace members 25 and detachably fastened with bolts to four brackets 77 fixedly mounted or welded to the bottom of each elongated extension to strengthen and support the wing decks 23 and 24, and further having elongated preferably wooden floors 26 and 27 fixedly mounted or bolted upon the cross brace members 23 and 24 and the wing frames for convenient and safe access to either side of a boat 80, and also having padded corners at the rear of the boat dock and lift 10.

Figure 1:
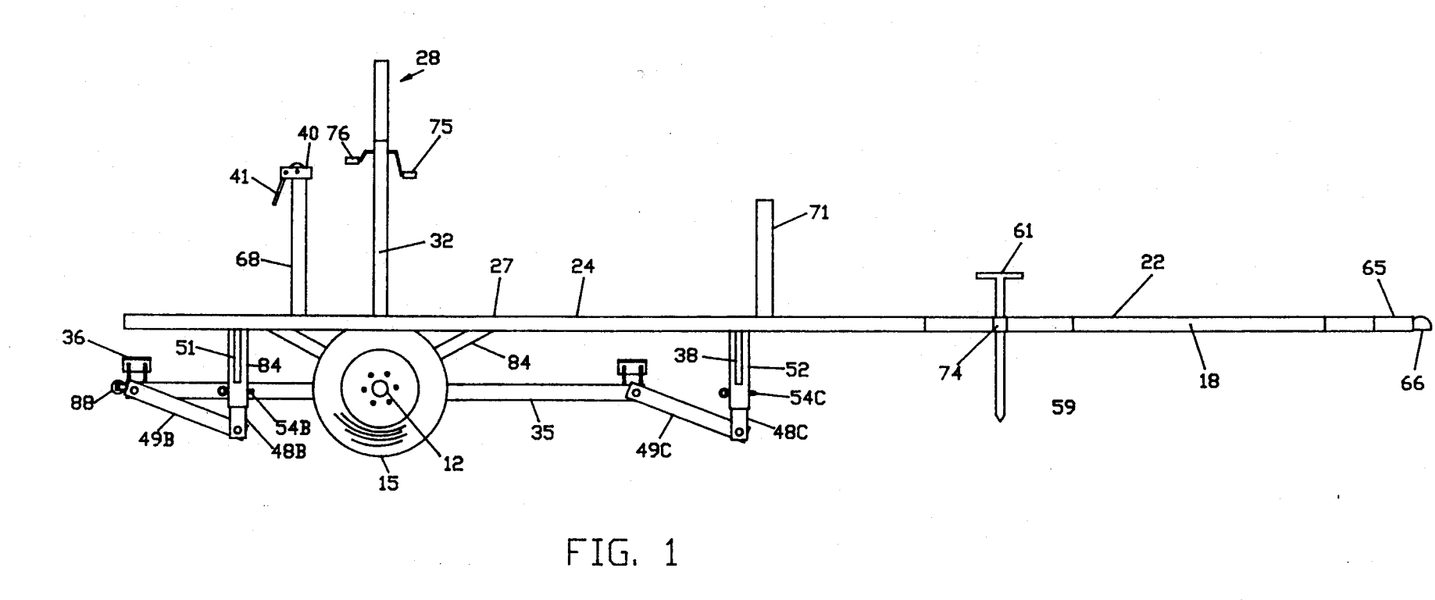
FIG. 1 is a side elevational view of the combination wheeled boat dock and lift.
Figure 4:
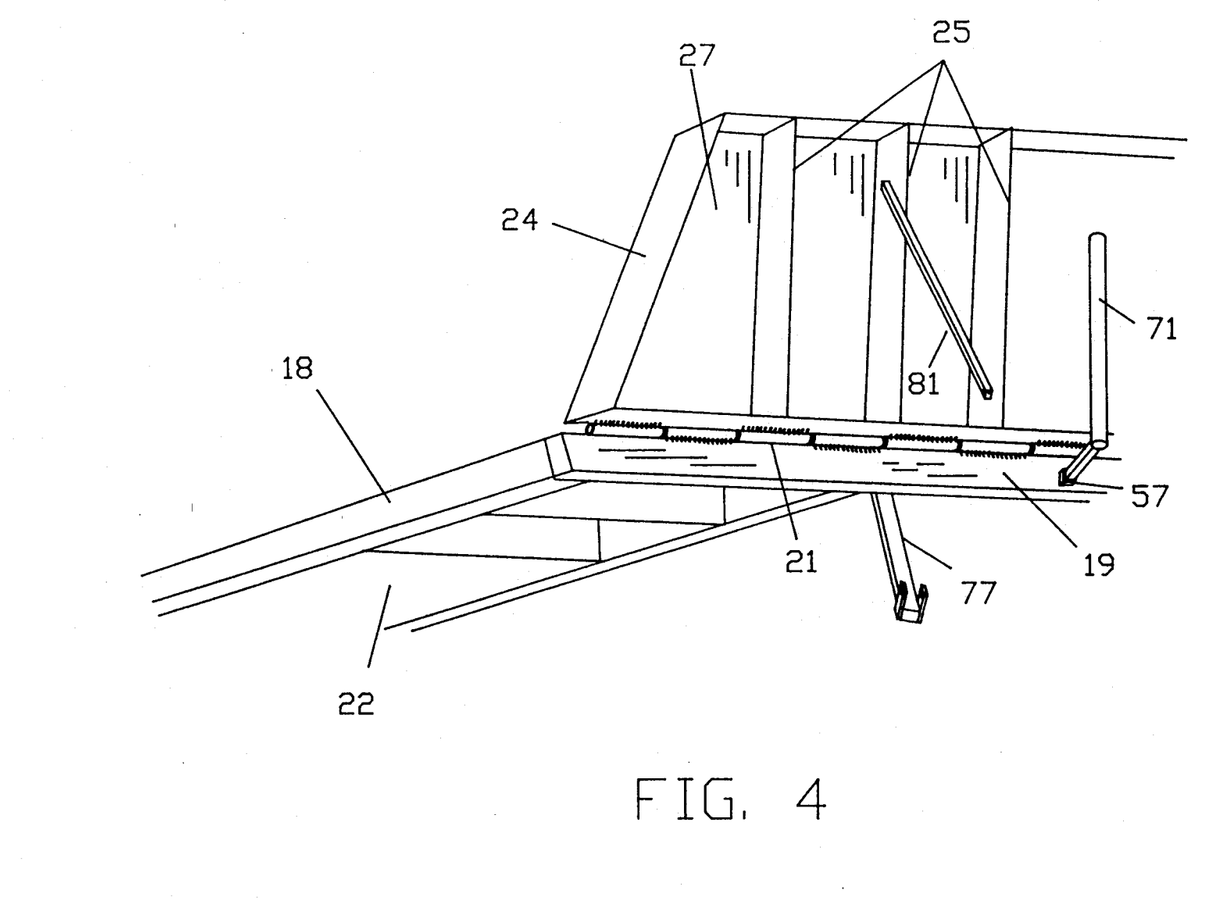
FIG. 4 is a section perspective view showing one of the wing frame members hingedly attached to the main deck.
Figure 8:
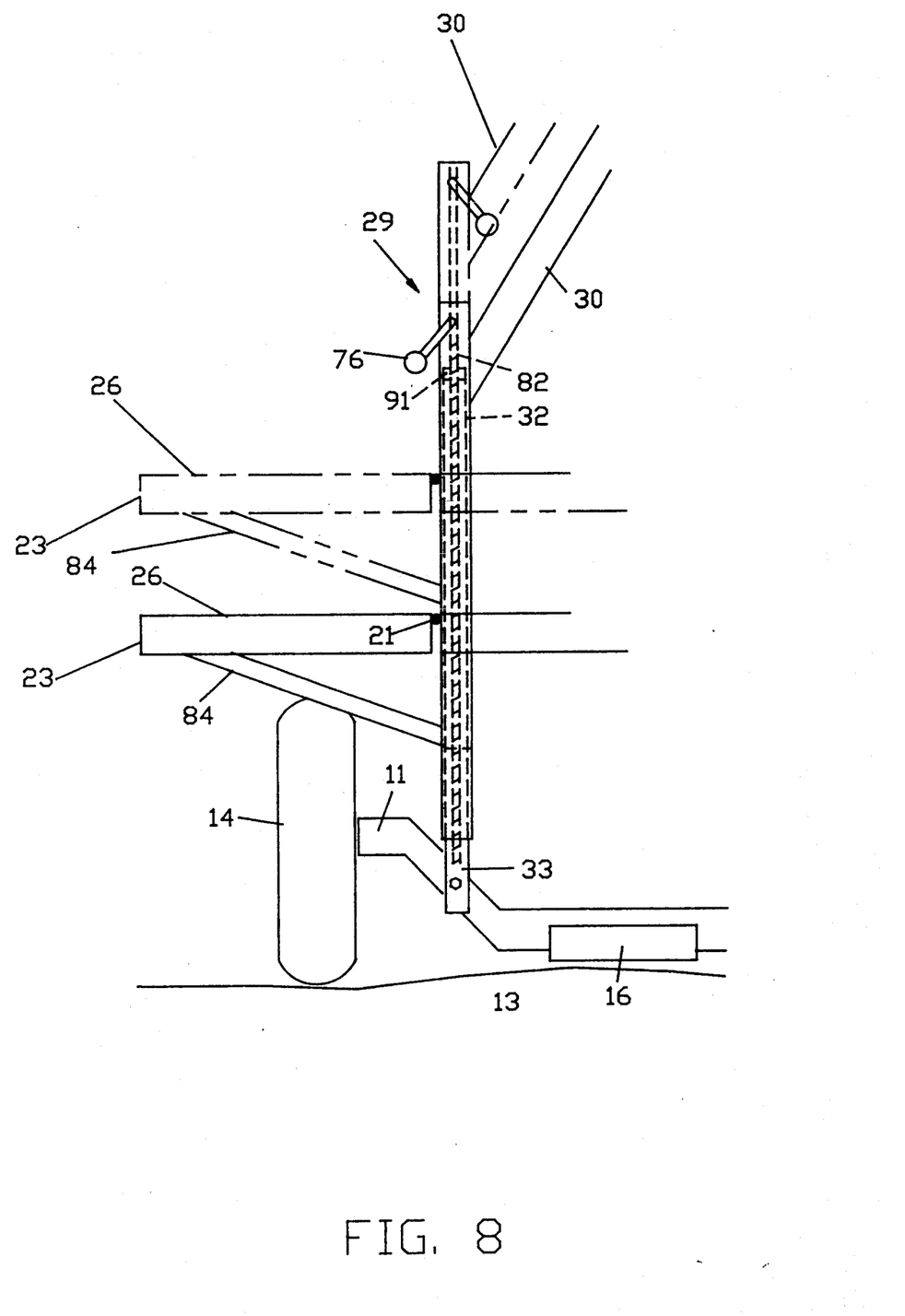
FIG. 8 is a detail section view in elevation showing one of the means adopted to raise and lower the decks.

FIG. 4 illustrate two elongate hinges 21 each comprising an elongated tube with a plurality of sleeves rotatably mounted end to end about each elongated tube with the longitudinal edges of each wing decks and the main deck 18 fixedly welded to and along the lengths of the plurality of sleeves. FIGS. 1 and 8 show a pair of jackscrews 28 and 29 interconnected by an arch support 30 to support and separate the jackscrews 28 and 29 and having elongate upright sleeve-like members 31 and 32 affixed or bolted to and extending upward from the main deck 18 adjacent to the wing decks 23 and 24 and further affixed or welded to four angled struts 84 of the main frame to further support the main deck 18 and the wing decks 23 and 24, said sleeve-like members 31 and 32 adjustably slidable upon upright tubular bases 33 and 34 having downward extending projections from opposite sides thereof and fixedly bolted to the transverse frame 13 and the stub axles 11 and 12 for adjusting the height of the wing floors 26 and 27 to substantially horizontally level the wing floors 26 and 27 relative to the forward main deck 18.

Figure 7:
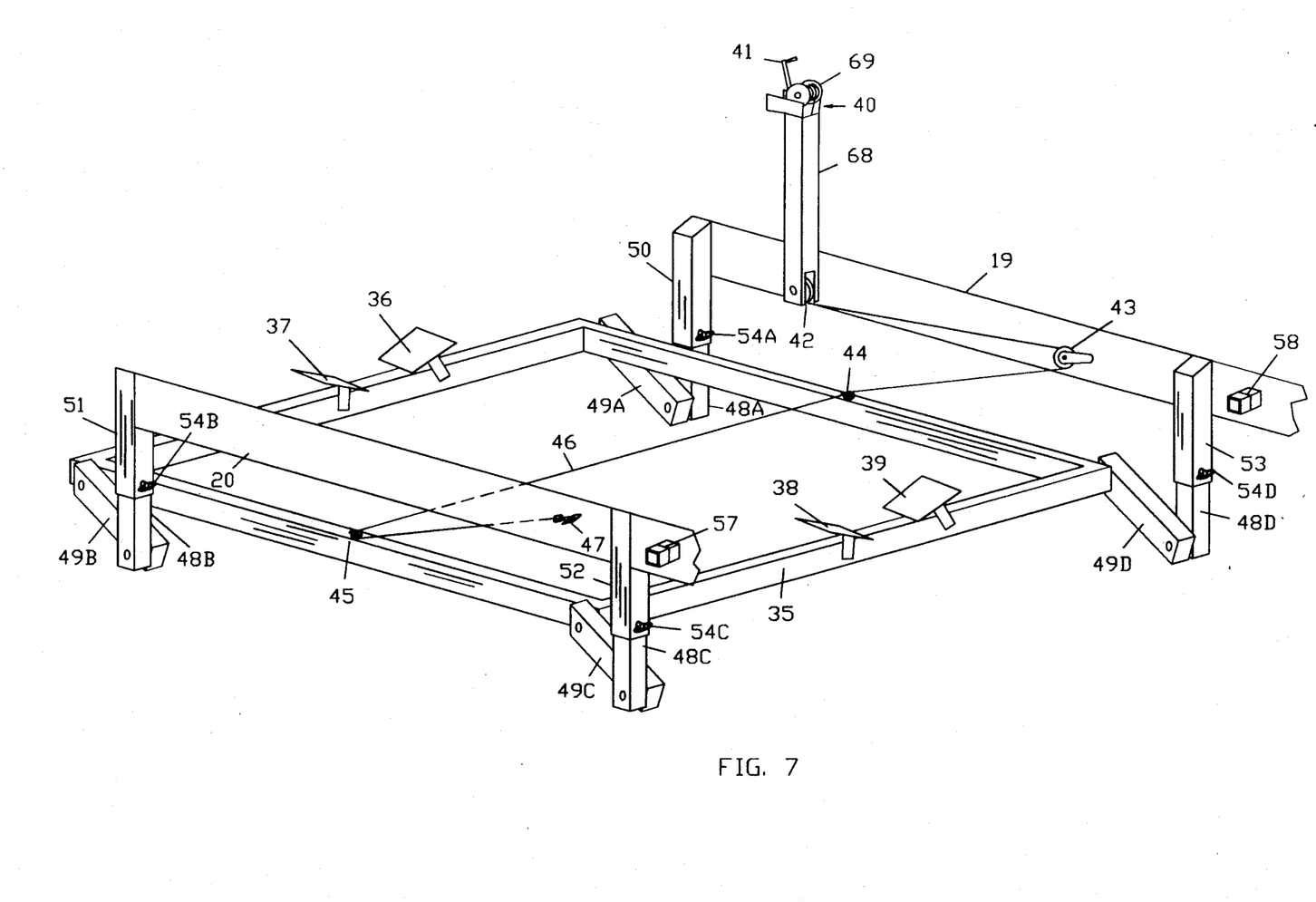
FIG. 7 is a detail view in perspective showing the means adopted to lift the boat.

FIG. 7 illustrate a lift frame base 35 comprising a plurality of channel irons arranged in a generally rectangular configuration to provide strength and support to the lift frame base 35 which lifts and lowers a boat 80 removably mounted thereupon; two pairs of boat mounting support members 36, 37, 38, and 39 pivotally mounted on opposite ends of the lift frame base 35 to engagably support and balance the hull of a boat 80 mounted on the lift frame base 35; and a winch mechanism 40 mounted on one of the elongate extensions of the main deck 18 and having a crank handle 41, four pulleys 42, 43, 44, and 45, two of which are securely mounted to the side edges of the lift frame base 35 and the other two of which are bolted to the sides of the elongate extensions 19 and 20 of the main deck 18 in the boat-receiving space, and a cable 46 passing in and about the pulleys and removably attached to a cable crimp 47 fixedly attached or bolted to the side of one of the elongate extensions of the main deck 18 opposite the elongate extension upon which the winch mechanism 40 is mounted, for raising and lowering the lift frame base 35 which is pivotally mounted to four linkage members each having a pair of levers 48 and 49 pivotally attached at their ends with one lever in each pair selectively slidable in lift support sleeves 50, 51, 52, and 53 which are bolted or affixed to the inside of the main deck 18.

Figure 2:
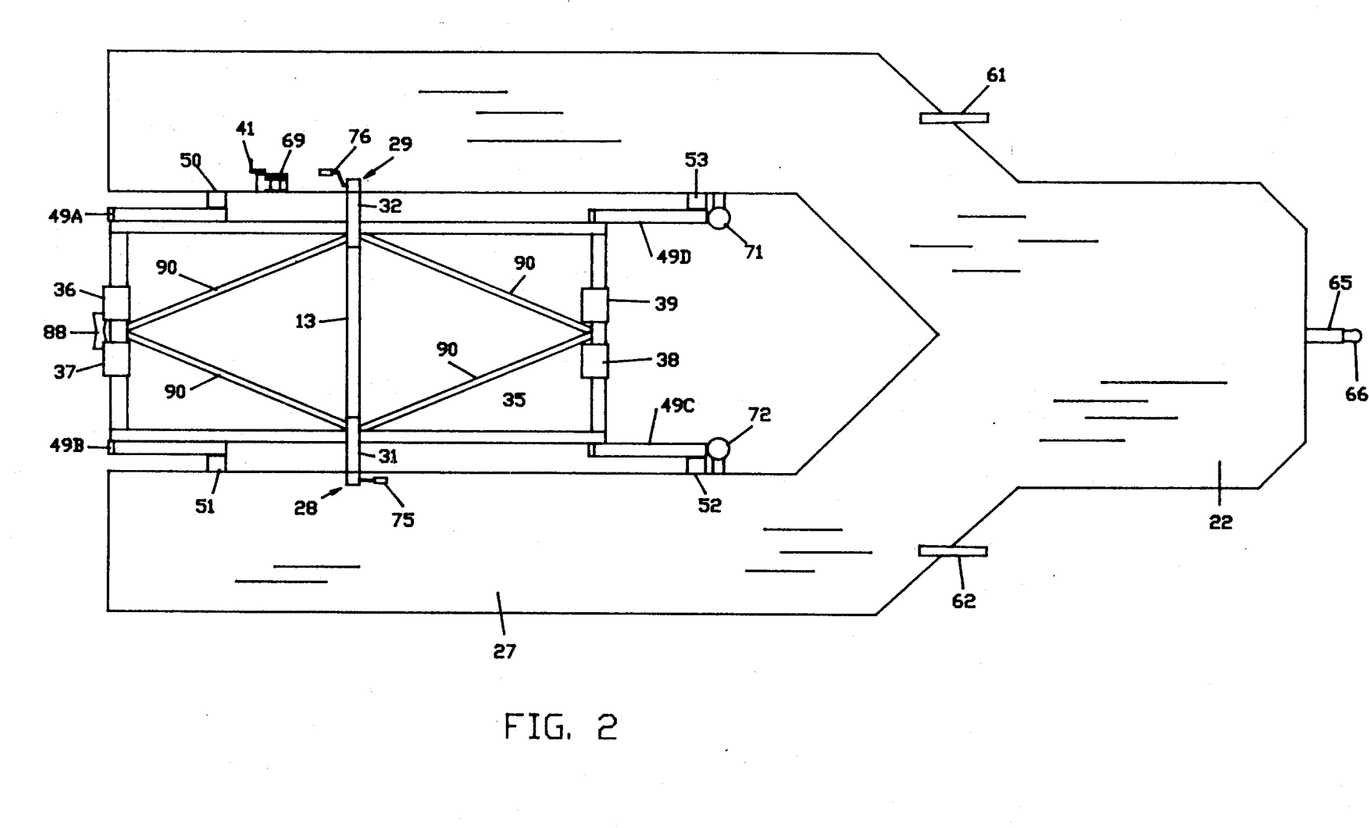
FIG. 2 is a top plan view of the combination wheeled boat dock and lift.
Figure 3:
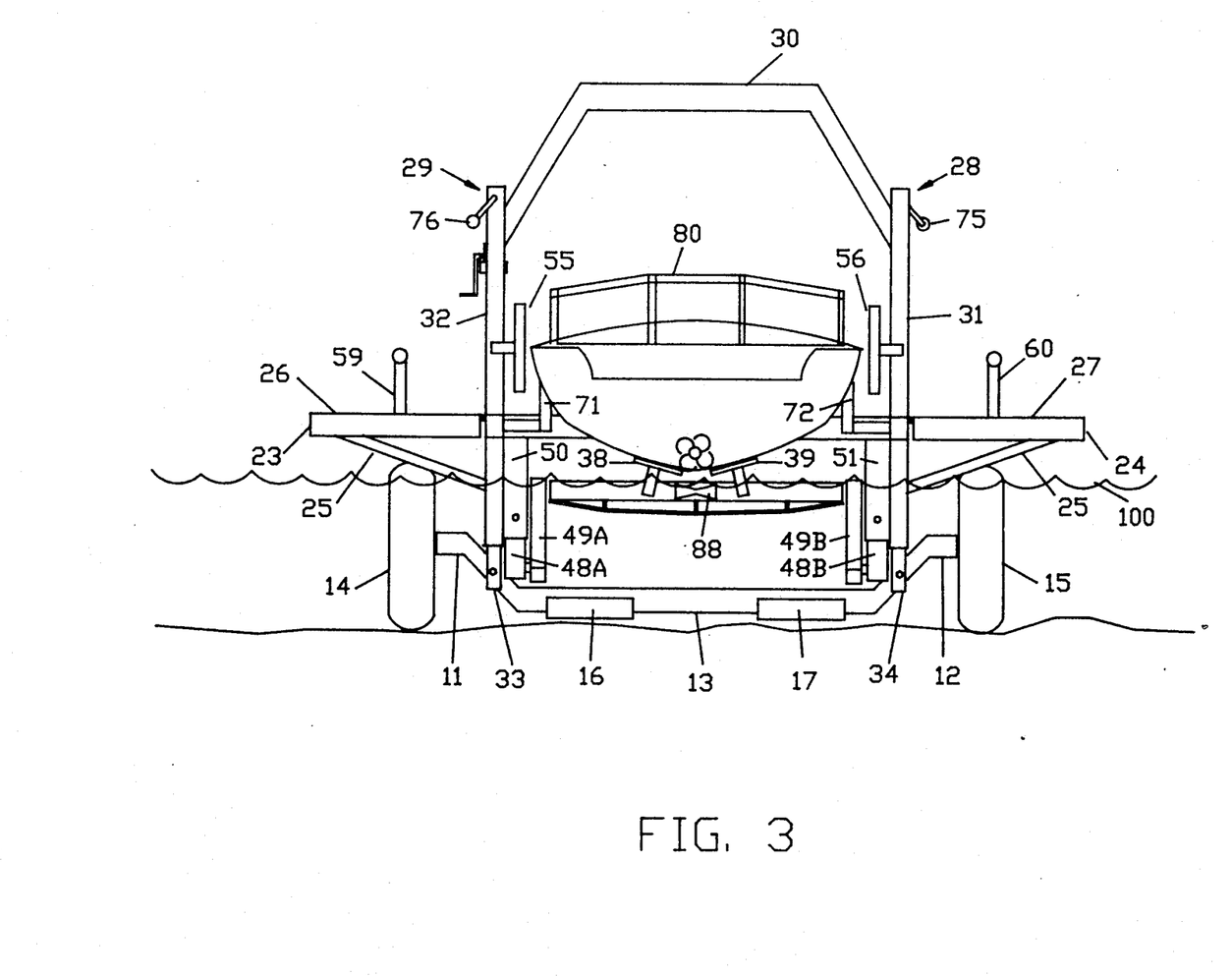
FIG. 3 is a forward view of the combination wheeled boat dock and lift showing a boat mounted on the lift frame base.

As shown in FIGS. 1 2, and 7, the boat lift and dock 10 further comprises a hitch means comprising a tongue member 65 securely attached to and extending forward the Y-shaped boarding deck 22 for mounting to a hitch or the like on a vehicle for easy moving the lift and dock 10. Also, as illustrated in FIGS. 1 through 5, two generally L-shaped upright bumper members 55 and 56 are removably mounted in the boat receiving space in a pair of tubular channel members 57 and which are fixedly mounted through the sides of the main deck 18 to protect the sides of the boat mounted on the lift frame base 35. As illustrated in FIGS. 3 and 4, two vertically extending padded rods 71 and 72 to further protect the sides of a boat 80 are fixedly mounted or bolted to the jackscrew sleeve-like members 31 and 32 in the boat receiving space.

Figure 5:
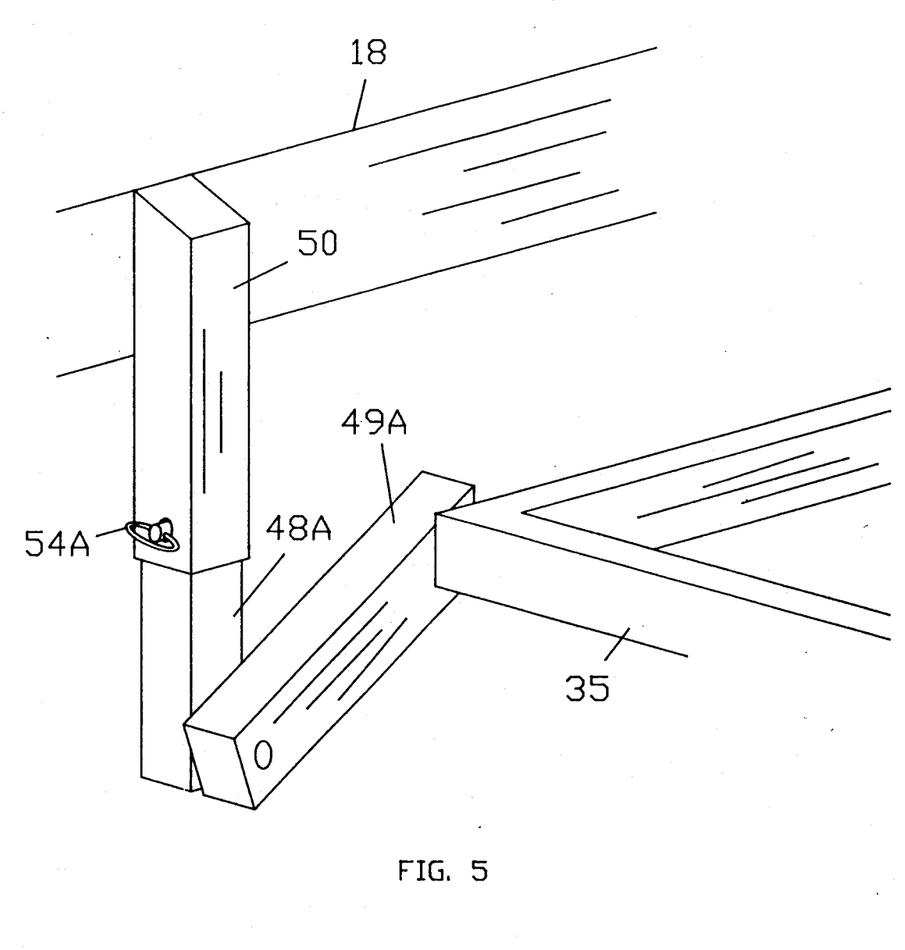
FIG. 5 is a partial perspective view showing how the lift frame base is adjustably mounted to the lift support sleeves and the linkage members.
Figure 6:
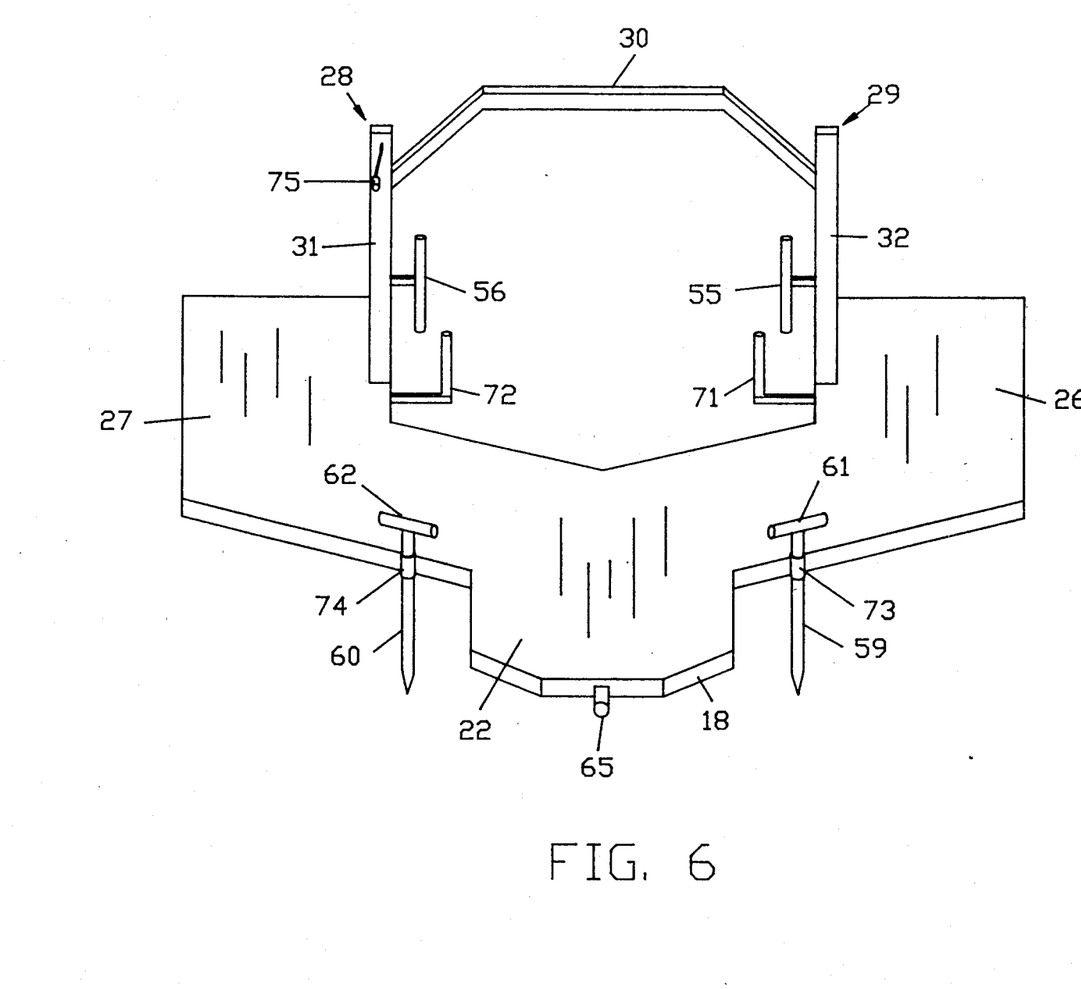
FIG. 6 is a rearward perspective view of the combination wheeled boat dock and lift apparatus showing the support stake members adjustably mounted to the main frame.

As shown in FIG. 5, the four lift support sleeves 50, 51, 52, and 53 are also mounted in the boat receiving space and bolted to the sides of the elongate extensions 19 and 20 of the main deck 18 relative to the four corners of the rectangular lift frame base 35 to support and stabilize the lift frame base 35.

Further, as shown in FIG. 7, the combination boat dock and lift 10 comprises a pair of elongate stake members 59 and 60 having T handles 61 and 62 at the top ends thereof for easy manipulation of the stake members 59 and 60 and having a plurality of holes 63 along the length thereof and adjustably mounted in a pair of stake sleeves 73 and 74 fixedly attached to or bolted to the outside perimeter of the main deck 18 on opposite sides thereof for securing the combination boat dock and lift 10 in the water and along the shore regardless of the terrain of the shore. Two capscrews (not shown) are threaded through the sides of the stake sleeves 73 and 74 to adjustably engage the stake members 59 and 60 which can be selectively raised and lowered through the stake sleeve members 73 and 74 depending upon the depth of the water along the shore to effectively secure the boat dock and lift 10 in the water.

The combination boat dock and lift 10 can be conveniently and easily moved to almost any desirable location about a body of water. As shown in FIG. 1, the hitch means on the boat dock and lift 10 has a ball receiving end 66 and a locking latch (not shown) forward of the tongue member 65 for effectively hitching and locking the tongue member 65 to a standard ball hitch mounted on a vehicle to drive the boat dock and lift 10 in and out of the water. To transport the boat dock and lift 10, the lift frame base 35 should preferably be raised to a locking transport position.

To raise the lift frame base 35, the user actuates the winch mechanism 40 which is mounted upon an elongate winch support member 68 which is fixedly mounted upon one of the elongate extensions 19 of the main deck 18. As shown in FIG. 8, the winch mechanism 40 preferably comprises a rotatable spool 69, a crank 41 attached to the rotatable spool 69 for rotation therewith, a locking member engagably biased to the spool 69 to effectively lock the spool 69, and cable 46 wound about the spool 69 and passing in and about the four pulleys 42, 43, 44, and 45 and attached to the cable crimp 47. Alternatively, the winch mechanism 40 could be an electric or gas motor to drive the spool 69, a power cord connected to a power supply and to the electric motor, and a switch to energize the motor to actuate the winch mechanism. To actuate the winch mechanism 40, the user rotates the crank 41 to retract the cable 46 to shorten the distance between the cable crimp 47 and the spool 69 effecting raising the lift frame base 35. In addition to raising and lowering the lift frame base 35, the height of the lift frame base 35 can also be selectively set before the dock and lift 10 is moved into a body of water by sliding the four linkage members upward or downward within the four tubular lift support sleeves. The four levers 48 mounted in the lift support sleeves 50, 51, 52, and 53, each have a plurality of holes along the length thereof and are selectively slidably locked in the lift support sleeves 50, 51, 52, and 53 with removable pins 54A, 54B, 54C, and 54D slidably inserted in through the holes of the levers 48 and the tubular lift support sleeves 50, 51, 52, and 53.

To transport the combination boat dock and lift 10 to another location, the user can narrow the width of the boat dock and lift 10 easily and conveniently for transportation on a road or such by folding the wing decks 23 and 24 upon the hinged joints. The L-shaped bumper members 55 and 56 are preferably used to hold the wing decks 23 and 24 in the folded positions by sliding the bumper members 55 and 56 from in the boat receiving space out of the ends of the pair of tubular channel members 57 and and into the opposite ends of the tubular channel members 57 and to engage the bottom of the wing floors 26 and 27 to hold the wing decks 23 and 24 in the folded positions. The bumper members 55 and 56 are locked into the tubular channel members 57 and with a pair of removable pins which are slidably inserted in holes in both the bumper members 55 and 56 and tubular channel members 57.

To position the combination boat dock and lift 10 in a body of water, the user preferably backs the boat dock and lift 10 into the water with the front of the boarding deck 22 extending out of the water and resting on the shore for the user to conveniently board the boat dock and lift 10. To secure the boat dock and lift 10 so that it won't drift out into the water, the user preferably drops the two stake members 59 and 60 into engagement with the floor of the water and locks the stake members 59 and 60 in the floor engagement positions with a pair of pins slidably insertable in through holes in both the stake members 59 and 60 and the stake sleeve members 73 and 74.

Once the boat dock and lift 10 is secured in the body of water, the user should preferably level the wing floors 26 and 27 relative to the boarding deck 22 to provide a substantially safe and sturdy surface for the user to walk upon to board and disembark boats moored to the dock 10. As illustrated in FIG. 8, the user can adjust the height of the wing floors 26 and 27 relative to the boarding deck 22 by preferably actuating the jackscrews 28 and 29 mounted to the inside longitudinal rims of the elongated extensions 19 and 20 of the main deck 18 and comprising a pair of tubular sleeve-like members 31 and 32, a pair of threaded rods (not shown) fixedly attached at their ends to a pair of gears (not shown) which engage a pair of gears (not shown) fixedly attached to the ends of a pair of shafts (not shown) integral to a pair of jack handles 75 and 76, and a pair of jack support bases 33 and 34 having threaded bores 91 through their ends to receive the threaded rods 82. The jack handles 75 and 76 are rotatably mounted exterior of and through holes in the tubular sleeve-like members 31 and 32 near the tops thereof. Each of the wing floors 26 and 27 can be selectively raised and lowered independent of each other. The user preferably rotates the jack handle of each jackscrew, which turns the threaded rod either into the jack base urging the jack sleeve downward relative to the jack base and lowering the wing deck, or out of the jack base urging the jack sleeve upward relative to the jack base and raising the wing deck. After the wing floors 26 and 27 are substantially leveled, boats can be moored to the outside of the wing decks 23 and 24 or a boat can be moored in the boat receiving space between the wing decks 23 and 24 with the lift frame base 35 being lowered to the floor of the body of water. To lift the boat substantially out of the water, the user should preferably position the boat before the boat receiving space and move the boat into the boat receiving space engaging a guide member 88 rotatably mounted on a pair of brackets 85 and 86 at the rear end of the lift frame base and urge the boat upon the lift frame 35 with the hull of the boat stably mounted upon the boat support members 36, 37, 38, and 39, and the user should then actuate the winch mechanism 40 to retract the cable 46 about the spool 69, effecting pivoting of the lift frame base 35 about the linkage members 48 and 49 and raising the lift frame base 35 which is raisable to generally align with the main deck 18.

To drop or lower the boat 80 into the water, the user actuates the winch mechanism 40 to release cable 46 from about the spool 69. The lift frame base 35, through gravitational forces and the weight of a boat 80 and the lift frame base 35 itself which is preferably constructed of channel iron and cross beams 90 lowers relative to the main deck 18 as the cable 46 is released about the spool 69. The combination boat dock and lift 10 permits the user to have and use a convenient and effective boat dock and lift all in one self-contained unit and to be able to easily transport the boat dock and lift to almost any desirable location about any body of water. The prior art illustrates boat docks and lifts which are separate from each other and which do not provide means for easy transportation thereof.

It will be obvious that various changes and departures may be made to the invention without departing from the spirit and scope thereof. Accordingly, it is not intended that the invention be limited to that specifically described in the specification or as illustrated in the drawing but only as set forth in the claims.

What is claimed is:

1. A combination boat dock and lift comprising
   at least one wheeled axle to provide convenient movability of said boat dock and lift as desired by a user thereof;
   jack means fixedly mounted upon and near the ends of said wheeled axle;

a main deck having a main frame having a pair of elongate extensions extending rearwardly and defining a boat receiving space therebetween and fixedly mounted to and vertically adjustable by said jack means, said main deck further having a floor for a user to board said dock and lift;

at least two wing decks having wing frames having longitudinal edges hingedly attached to said elongate extensions, said wing decks lockingly foldable upon said hinged joints to facilitate portability of said dock and lift;

a vertically adjustable lift frame means mounted in said boat receiving space for lifting and storing much of a boat above water and lowering said boat into the water;

a winch means mounted upon said main frame to actuate said lift frame means to raise much of a boat above water and lower said boat into the water;

a hitch means affixed to and forward of said main frame to detachably mount to a vehicle for moving said boat dock and lift in, out, and about a body of water;

means to secure and stabilize said boat dock and lift in a body of water and on a shore thereof to prevent said boat dock and lift from drifting out into the body of water.

2. A combination boat dock and lift as described in claim 1, wherein two wheeled axles are interconnected by a transverse frame under which two spaced apart skid plates are fixedly attached to minimize sinking of said boat dock and lift into a floor of a body of water and to support said boat dock and lift and to permit a user to demount said wheels from said axles to protect said wheels from effects of the water.

3. A combination boat dock and lift as described in claim 1, wherein said jack means comprise at least two jackscrews each having a base vertically and fixedly mounted upon said wheeled axle and having a sleeve-like member selectively slidable upon said base and affixed to said main deck to substantially horizontally level said decks.

4. A combination boat dock and lift as described in claim 1, wherein said main deck interconnects said wing decks forward of said boat receiving space.

5. A combination boat dock and lift as described in claim 1, wherein said wing decks have floors which extend generally parallel to each other and which provide convenient access to either side of a boat in said boat receiving space.

6. A combination boat dock and lift as described in claim 5, wherein said wing decks are vertically and independently adjustable by said jack means to provide a generally level, safe surface for said user to move upon.

7. A combination boat dock and lift as described in claim 1, wherein said height adjustable lift frame means further comprise a lift frame base having boat support means to support and balance a boat mounted on said lift frame base;

a plurality of linkage members pivotally attached to and spaced about said lift frame base to support said lift frame, and telescopically mounted proximate to said main deck to raise and lower said lift frame base relative to said wing decks and said main deck.

8. A combination boat dock and lift as described in claim 1, wherein the winch means comprise a plurality of pulleys fixedly mounted to said lift frame means and to said main frame; and a winch having a cable passing in and about said pulleys and passing through said boat receiving space and detachably connected to said main frame opposite said winch, for raising and lowering said lift frame.

* * * * *